C. E. PIERCE.
COTTON CULTIVATOR.
APPLICATION FILED FEB. 25, 1915.
1,170,459.
Patented Feb. 1, 1916.
5 SHEETS—SHEET 1.
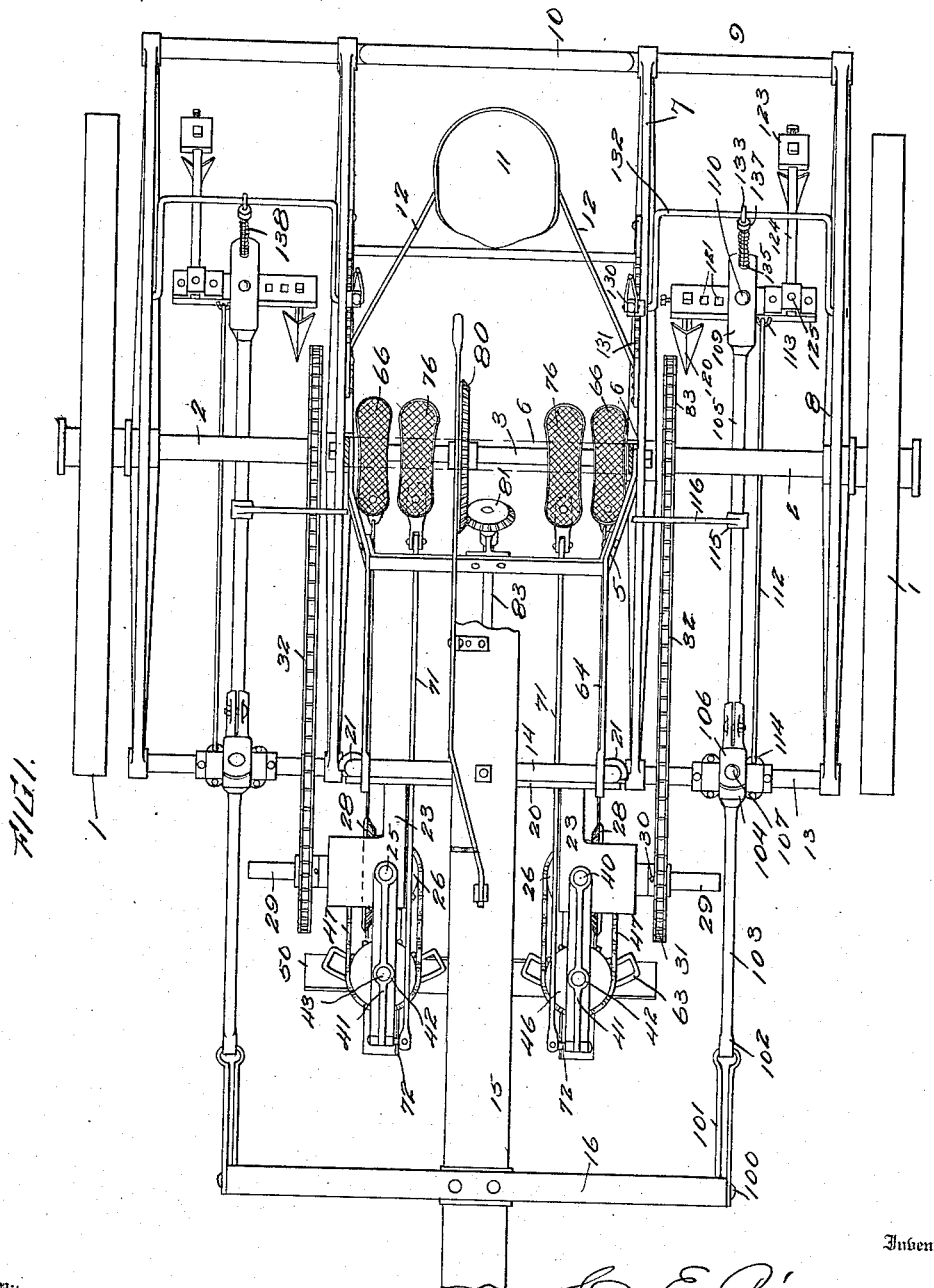
Witnesses:
Inventor
C. E. Pierce,
By Beall & Fenwick,
Attorneys.

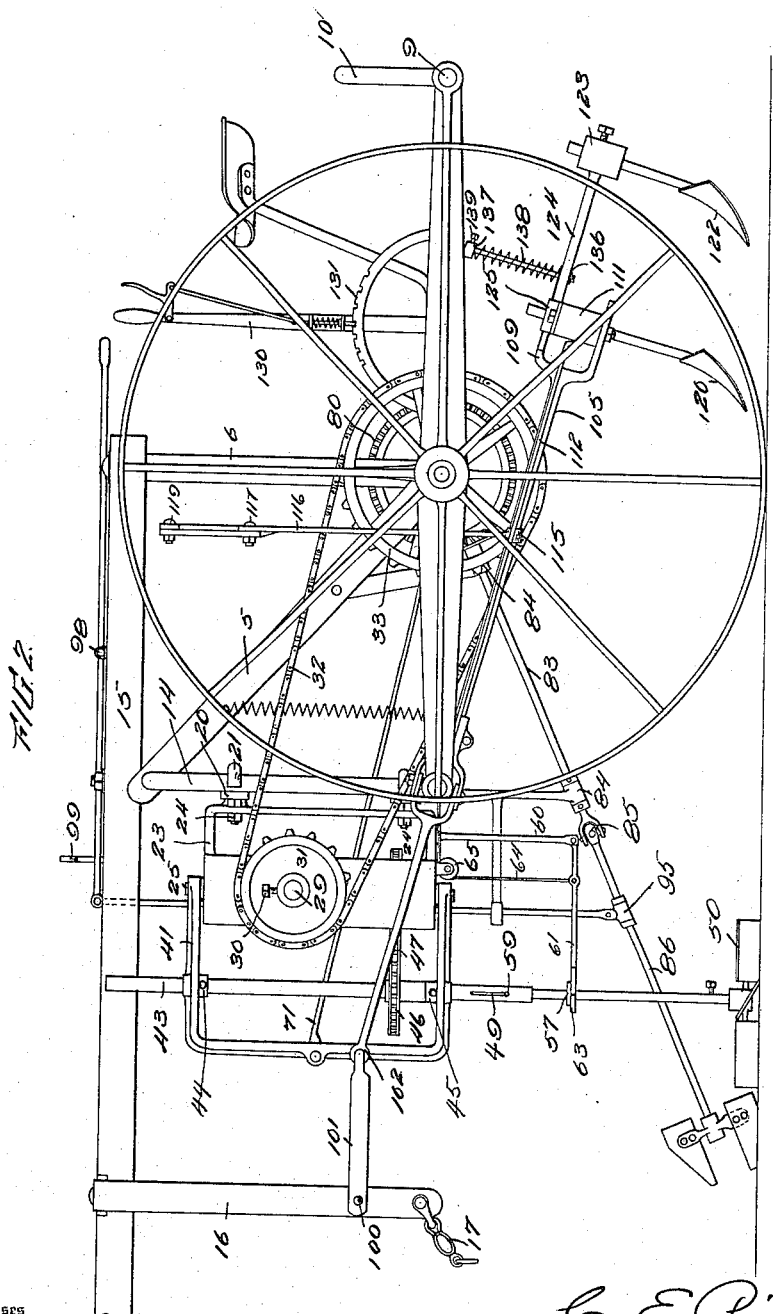

C. E. PIERCE.
COTTON CULTIVATOR.
APPLICATION FILED FEB. 25, 1915.
1,170,459.
Patented Feb. 1, 1916.
5 SHEETS—SHEET 3.
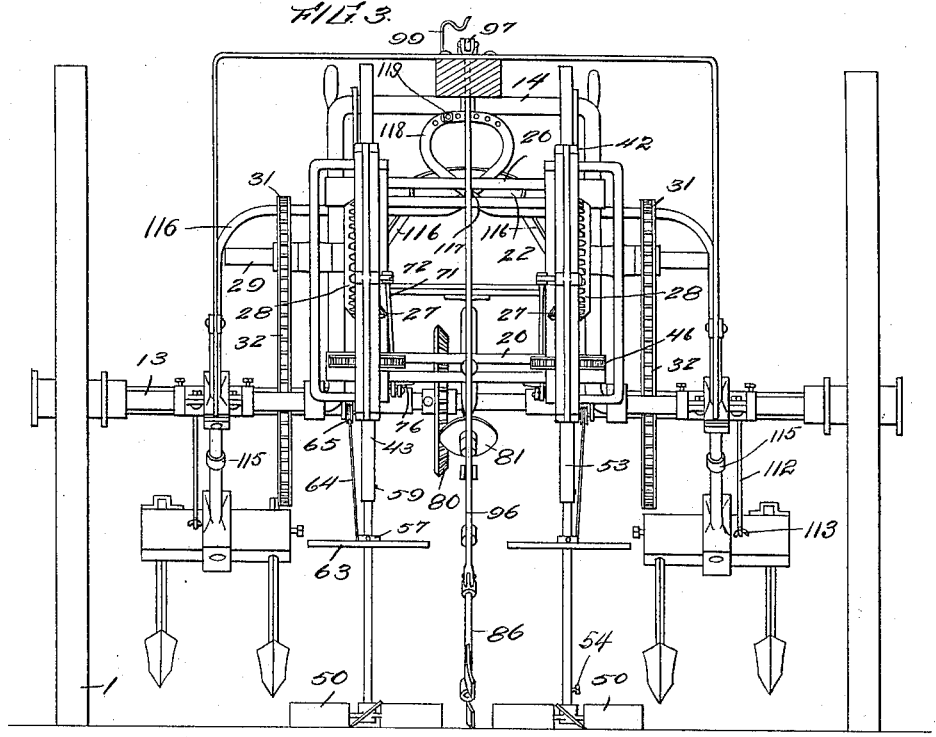
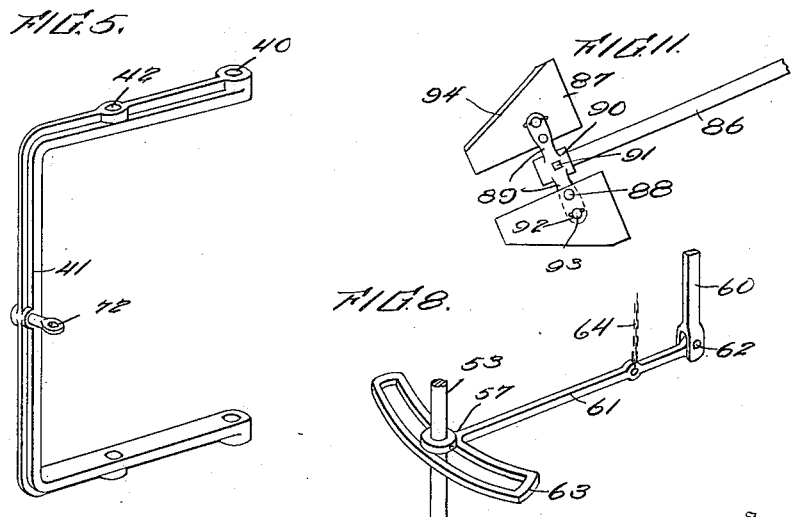
Witnesses:
Inventor:
C. E. Pierce
By Beall & Fenwick,
Attorneys.
THE COLUMBIA PLANOGRAPH CO., WASHINGTON, D. C.

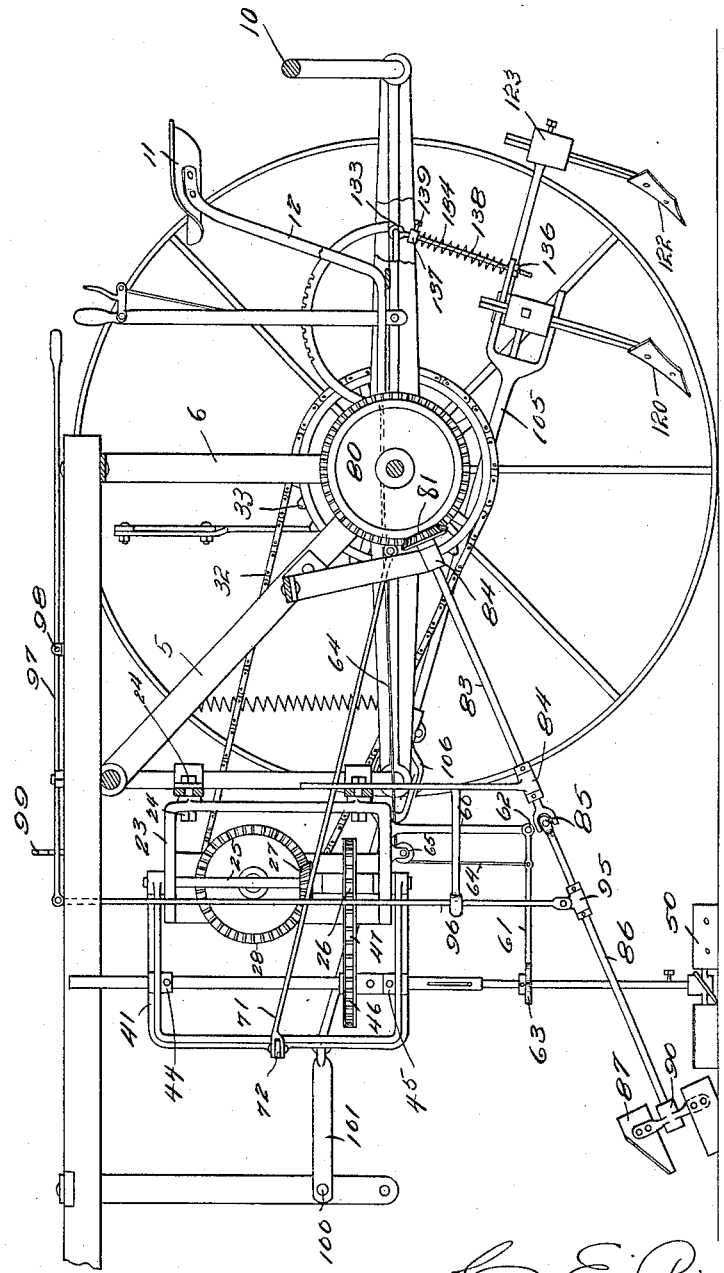

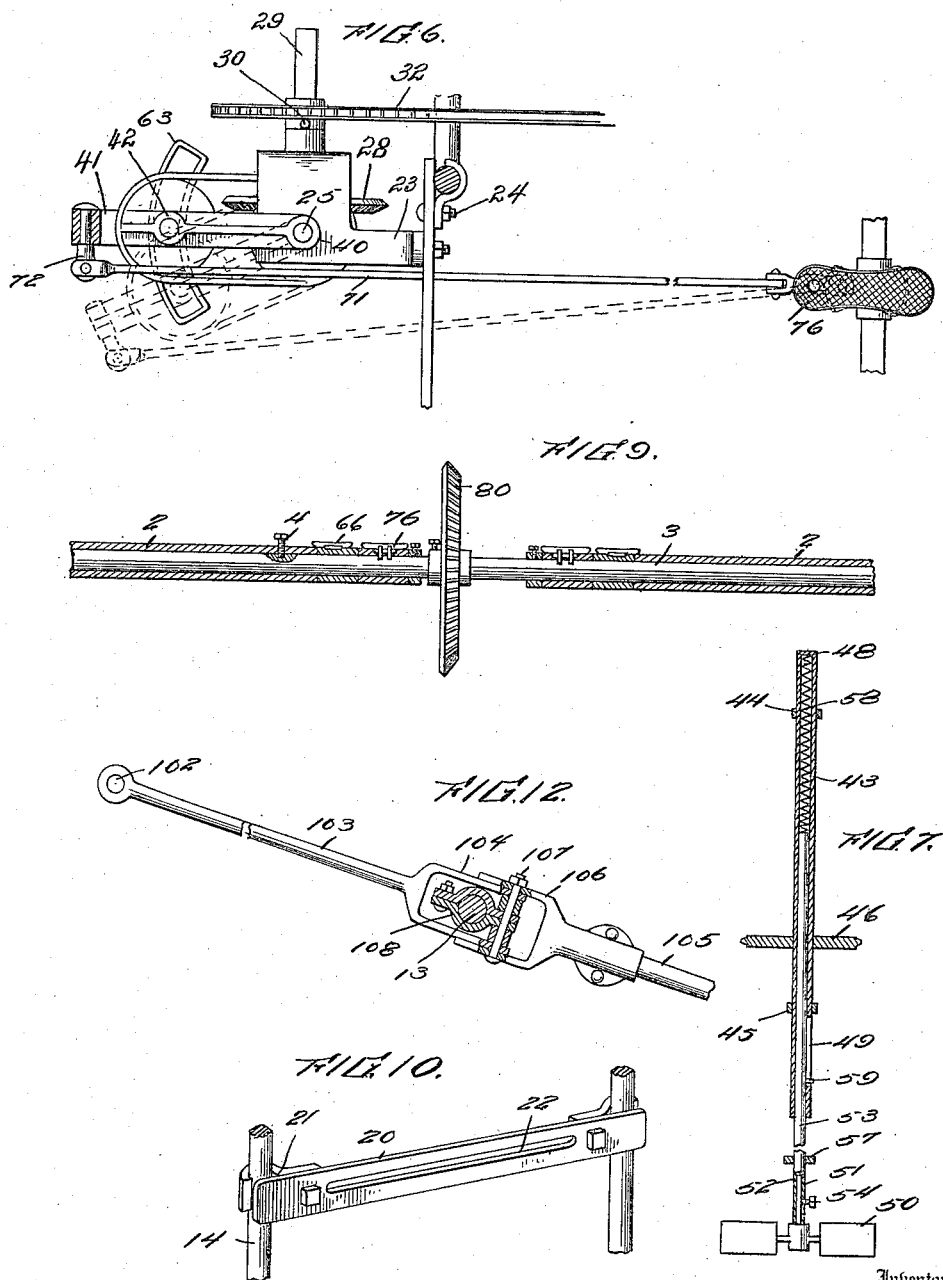

UNITED STATES PATENT OFFICE.

CLARENCE E. PIERCE, OF STARKVILLE, MISSISSIPPI.

COTTON-CULTIVATOR.

1,170,459.   Specification of Letters Patent.   Patented Feb. 1, 1916.

Application filed February 25, 1915.  Serial No. 10,588.

*To all whom it may concern:*

Be it known that I, CLARENCE ELLIS PIERCE, a citizen of the United States, residing at Starkville, in the county of Oktibbeha and State of Mississippi, have invented certain new and useful Improvements in Cotton-Cultivators, of which the following is a specification.

This invention relates to cultivators, and more especially to those which rotate in a horizontal plane; and the principal object of the same is to produce a cultivator which is especially useful on cotton and other plants which are drilled in rows.

A secondary object is to combine with the cultivating elements a chopping or blocking mechanism by means of which the young plants can be cut out at intervals along the row so as to leave them in hills.

What might be called a third object of the invention is the provision of complementary devices at the rear end of the machine which round out the cultivation of the earth, as by scraping it, leveling it, or even plowing it as illustrated in the drawings.

These various objects are carried out by the machine fully described in the following specification and illustrated in the accompanying drawings wherein:—

Figure 1 is a plan view with the main arch in broken lines, Fig. 2 a left side elevation, Fig. 3 a front elevation, and Fig. 4 a longitudinal section, of the entire machine. Fig. 5 is an enlarged perspective detail of one of the knuckles, Fig. 6 is an enlarged plan view of the knuckle-swinging mechanism, Fig. 7 a vertical section through the telescopic hoe shaft, and Fig. 8 a perspective detail of the hoe raising mechanism. Fig. 9 is a longitudinal vertical section of the telescopic portion of the main shaft. Fig. 10 is a perspective detail of one of the removable cross braces in the framework. Fig. 11 is an enlarged side elevation of the cotton chopping or blocking hoe. Fig. 12 is a side elevation of the drag bar for one of the plows, with its joint in section.

I do not wish to be limited to the specific construction of any part of this machine, and have illustrated and described only one means of carrying out the general idea; and on this basis considerable latitude must be allowed the manufacturer, especially with respect to the framework for supporting the several mechanisms below. As shown in the drawings, two main wheels 1 are mounted fast at the outer ends of two tubular axle sections 2 standing in strict alinement at their spaced inner ends as best seen in Fig. 9, and a solid axle section or shaft 3 is telescopically mounted in the inner ends of said tubular sections and removably held in one of them by means of a set screw 4. The axle sections 2 lead thence outwardly through and are journaled in oblique frame bars 5, thence through the lower ends of an arch 6, and thence through inner side bars 7 and outer side bars 8. All four side bars extend to the rear of the axle where they are firmly connected by a cross rod 9 which is arched at its center at 10; and I also mount the seat 11 on supports 12 which rise from the frame forward of the arch 10, and may possibly be rendered adjustable in any suitable way. The front ends of all four side bars are connected by another cross rod 13 having an arch 14 at its center forward of the main arch 6; and the tongue 15 is secured upon the latter and extends thence across and is secured to the arch 14, beyond which it extends for a sufficient distance forward of the machine to permit the attachment of the draft animals. For this latter purpose another and larger arch 16 is carried by the tongue at a point best indicated in Figs. 1 and 2, and to the lower ends of its arms are attached the whiffletrees 17 which are employed if the machine is drawn by horses or mules although it is quite possible to propel this machine by traction power. The various frame elements described are suitably connected at their points of inter-section or crossing, and means may be present for permitting adjustments and repairs.

On the side arms of the arch 14 are removably mounted two cross bars 20, as by means of the clips 21 bolted thereto as seen in Fig. 10, and each cross bar is slotted as seen at 22. These slots permit the lateral adjustment of two castings 23 whose supporting bolts 24 pass through such slots, and as said castings are duplicates of each other except that one is a "right" and the other a "left" member, I need describe but one with the mechanism it contains. Through its top and bottom is journaled an upright shaft 25 carrying near its lower end a sprocket 26 and above the sprocket a beveled pinion 27. The latter meshes with a beveled gear 28 which is fast on a horizontal shaft 29 journaled in and projecting outward through the casting. Adjustably mounted on this shaft as by means of a set screw 30 is a sprocket 31, which is connected by a chain belt 32 with a driving sprocket 33 fast on one of the tubular axle sections 2. Therefore rotation of the main wheel, through these sprockets and their connecting chain and through the intermeshing gear and pinion, rotates the upright shaft 25. Mounted on said upright shaft as a center are eyes 40 at the extremities of a U-shaped bracket or "knuckle" 41 as best seen in Fig. 5, and journaled in bearings 42 in the upper and lower arms of said knuckle is the tubular upper member 43 of the telescopic hoe shaft best seen in Fig. 7, said member being held in the knuckle by means of collars 44 and 45 as seen in Fig. 3. On said member within the knuckle is fixed a sprocket 46 which is connected by a chain belt 47 with the sprocket 26 on the shaft 25, and therefore the rotation of this shaft from the main wheel is communicated to the hoe shaft through the casting and swinging knuckle, and this rotation continues in whatever position the knuckle is set around shaft 25 as a center. The means for adjusting this knuckle will be described below.

The foremost cultivating elements of this machine are what I preferably call "hoes" as indicated at 50 in Fig. 7, and it is my intention that these hoes shall rotate in a horizontal plane slightly beneath the earth's surface so as to cut out the grass and other small weeds as will be explained later on. I have shown these hoes 50 as made somewhat in the shape of propellers, but do not wish to be limited to their construction, nor to the number or inclination of the blades. Each hoe 50 is by preference formed with a stem 51 rising from its hub into the tubular lower end 52 of the lower member 53 of the hoe shaft, and held therein removably and adjustably by any suitable means such as a set screw 54. This member passes up into the tubular member 43 which latter is slotted as seen at 49, and the member 53 carries a pin 59 engaging said slot so as to allow the lower member to reciprocate. Between its upper end and the closed upper end 48 of the tubular member is disposed an expansive spring 58 whose tendency is to force the lower member and the hoe downward so that the pin 59 strikes the lower end of the slot 49 although it may be raised against the force of the spring. The collar 57 fast on the lower member 53 is used for this purpose as will be next described.

Referring now more especially to Figs. 4 and 8, the numeral 60 designates a bracket arm depending from some fixed portion of the frame, and the rear end of a lever 61 is pivoted in this arm at 62 while its front end carries a loop 63 curved on the arc of a circle around the axis of the upright shaft 25—see Fig. 6—the loop embracing the lower member 53 of the hoe shaft just below said collar 57. From said lever a flexible wire or chain 64 leads upward over a pulley 65 and thence rearward through the machine to a pedal 66 which is pivotally mounted on the shaft 3 as best seen in Fig. 1. The result is that when the operator manipulates this pedal by moving his foot the wire or chain 64 is drawn upon and the lever 61 moved on its pivot 62 so that its loop 63 engaging under the collar 57 raises the lower member 53 of the hoe shaft and lifts the hoe 50 out of the ground, this member telescoping upward within the upper member 43 as far as the slot 49 will permit the pin 59 to travel; but as soon as pressure on the pedal is removed the expansive force of the spring 58 restores the parts to their working position. On the inner side of each knuckle 41 is a bearing or eye 72, to which is connected the forward end of a rod 71 leading thence backward to a pedal 76 mounted on the shaft 3 as seen in Fig. 9; and when the operator rocks this pedal with his foot the rod 71 causes the swinging of the knuckle from side to side on an arc around the upright shaft 25. During this motion there is no interruption to the rotary motion of the hoe which is imparted by the mechanism above described, from the rotation of the main wheel at that side of the machine. During this lateral swinging motion of the knuckle and hoe, the shaft of the latter moves within the arcuate loop 63, and there would be no interruption to the upward movement of the hoe excepting that the operator has his foot on the other pedal. In other words, with his foot on the inner pedal 76 he may swing the hoe from side to side to cultivate the plants in a manner described below, but with his foot on the outer pedal 66 he may raise the hoe out of the ground and even above the plants so that at that time no lateral movement of the hoe is necessary. By reference to Fig. 1 it will be seen that all this mechanism is duplicated at the other side of the machine.

It is well known that cotton is planted in rows, and in order to get the best results these rows must be cut out at intervals or "blocked" so as to leave hills of cotton. The same is true of other products, but I am describing my machine with particular reference to cotton.

On the main shaft 3 is mounted a beveled gear 80, the same meshing with a beveled pinion 81 at the upper end of a shaft 83 (see Figs. 2 and 4) which rotates in bearings 84 carried by supports depending from the framework and leads forward and downward from the main shaft.

The numeral 85 designates a universal joint connecting the shaft section 83 with another shaft section 86, to whose lower end is removably connected the cotton chopping or blocking hoe 87 best seen in Fig. 11. This hoe may be of any suitable construction, but as therein illustrated its blades are pivoted at 88 to arms 89 radiating from its hub 90 which is secured to shaft section 86 by set screw 91, and each blade has a slot 92 through which passes a set screw 93 engaging one of said arms so that the angle of the blade to the axis of the hub may be adjusted. The outer edges of the blades are sharpened as indicated at 94. This view shows two blades, but it is possible to have a greater or less number; and in addition to the adjustment of their cutting edges, it is possible to remove the entire hoe or chopper and substitute another. Forward of the universal joint a bearing 95 surrounds the shaft section 86, and from this bearing a rod 96 extends upward and connects with the front end of a lever 97 pivoted at 98 on the tongue 15 and extending back to within reach of the operator, a hook or other support 99 being provided for sustaining its front end in elevated position when it is desired to raise the chopping hoe off the ground and keep it there for turning corners or driving to or from the point where this machine is to be used. The shaft 83, 86 of this blocking hoe extends forward and obliquely downward from the main shaft and projects between the telescopic upright hoe-shafts 43, 53; and it is my intention to use this blocking hoe in conjunction with the cultivator hoe as will be described below. Yet it is also possible to remove this blocking hoe entirely, so that the cultivator hoes will treat the plants at a later period and after the surplus cotton in the rows has been previously cut out, so that it may be said that the chopping or blocking hoe is for use only when the cotton is cultivated the first time, and its purpose then is to cut out surplus plants and leave the remaining plants in hills as has been stated.

It is the purpose of my machine to complete the treatment of the plants at one passage over the ground. If it be the first treatment, the blocking hoe is used as has just been stated; but with any treatment means must be provided to complete the cultivation by supplementing the action of the rotary hoes. These have cut out the grass and weeds alongside of and between the hills, and opened up the soil to such an extent that it would dry out very rapidly if the ground were not quickly treated to prevent it. Therefore I provide at the rear end of this machine a pair of so-called "plows" by which term I mean to include elements which may scrape or level or plow the ground according to its nature and the necessities of the plants being treated. With cotton, whatever the nature of the soil, it is desirable that this machine shall leave the ground well pulverized and thrown up against and around the plants so that they shall not dry out, and it is one of the decided points of improvement possessed by the present invention that all these steps are performed simultaneously and mechanically so that drying out does not occur as it would if the cotton planter had to employ help to perform these steps successively and perhaps several days apart, just at a time when labor is hard to secure.

At both sides of the machine are plows of the construction about to be described, and as they are alike excepting that they are "rights" and "lefts", I need describe but one. Connected at the point 100 with one arm of the arch 16 is a link 101 whose rear end is loosely attached to the drag bar best seen in Fig. 12, as by means of an eye 102 at the front end of the same. This drag bar has a front member 103 forked at its rear end at 104, and a rear member 105 forked at its front end at 106. The fork arms overlap and are pivotally connected by a bolt 107, the bolt passing through a clip 108 standing within the inner fork 104 and surrounding the cross rod 13 which forms part of the main framework. The rear member 105 extends thence backward as seen in Figs. 1 and 2, and carries at its rear end a fork 109 in which at 110 is pivotally mounted a beam 111. The latter stands transverse to the length of the drag bar, and in order to hold it parallel with the main axle, a rod 112 is connected at 113 with the beam and at 114 with the cross rod 13 of the frame. The two drag bars at opposite sides of the machine pass through eyes 115 in the lower ends of members 116 of an arch, which members cross each other and are pivoted at 117 as seen in Fig. 2 and have their upper ends 118 turned inward and overlapping and pierced with a series of holes so that they may be adjustably connected by means of a bolt 119. No novelty is claimed for the structure of this arch, and the lower ends of its members maintain the lateral spacing of the drag bars and therefore of the two beams 111 at opposite sides of the machine. Each of said beams carries the complementary harrowing element or elements, and in the drawings herewith I have shown these as plows. The foremost plow 120 has its shank passing upward through one of a number of holes 121 in one end of the beam and adjustably and removably mounted therein. The rearmost plow 122 has its shank adjustably mounted in a block 123, and a stem 124 on said block extends forward through a clip 125 on the other end of the beam 111, in which it is adjustably mounted. This construction would cause one plow to travel forward of the other, while permitting the substitution of plows having shares of other shapes. I refer to them as "plows" but in reality they are cultivating elements which complement the cultivating hoes at the front, and I repeat that the beam could carry any other cultivating element without departing from the principle of my invention. The exact lateral disposition of these members is regulated by adjusting the width of the arch, which is done by setting the bolt 119 in proper holes as well understood. The draft of the horse on the whiffle-tree 17 is communicated through the link 101 to the cross rod 13, and thence through the drag bar to this member and its complementary element. For vertically adjusting the position of said member, I make use of a hand lever 130 moving alongside a toothed sector 131 and standing near the driver's seat 11, the lower end of the lever being fast on a cranked shaft 132 having its crank within the space between the side bars 7 and 8. Referring now to Figs. 1 and 4, the eye 133 of an eye-bolt 134 is mounted loosely on said crank, and its body passes downward through a hole 135 in the fork 109 and receives a nut or nuts 136 on its lower end. Coiled on said bolt between the upper fork arm and a collar 137 is an expansive spring 138, the collar being rendered adjustable by any suitable means such as a set screw 139. The result of this construction is that the driver may move the hand lever to raise the crank 132, and the eye-bolt 134, and the nut 136 on the latter will raise the fork 109 and the beam 111 and whatever is carried thereby; and when the operator moves the lever 130 in the opposite direction the weight of these parts will cause the beam to descend so that the plows engage the earth. The expansive force of the spring 138 is exerted to maintain the separation of the yoke and the crank, but should the plows strike an obstruction in the earth or a hard stretch of soil, they could rise and cause the upward movement of the fork 109 to compress the spring although the hand lever was locked on its sector 131. The loose engagement of the eye 133 with the crank 132, and the considerable length of the latter transversely of the machine, permits the lateral setting of these members by means of the arch 116 as referred to above, without interrupting the mechanism just described.

With a machine whose construction is substantially that above described, its uses on cotton are as follows: After the plants have become perhaps three inches high and appear in decided rows across the field, this machine in its entirety is brought into use, and we may assume that it is drawn by a pair of horses. These are driven astride the row to be treated, and the wheels 1 follow the horses. The operator takes his seat and places his feet on the inner pedals 76. As soon as the machine starts, the gear 80 causes the rotation of the chopping or blocking hoe whose blades at each revolution cut into the earth and block out certain portions of the row depending on the character of the hoe and the width of the cutting edges 94 of its blades; and what is so blocked out is tossed aside. Meanwhile the power sprockets 33 through the connections above described, cause the rapid rotation of the rotary cultivating elements or hoes 50 which travel a little beneath the earth's surface. The operator by manipulating the pedals 76 swings the two knuckles 41 outward so that these hoes pass the plants which are left standing in hills, then swings the knuckles inward so that the hoes operate on the ground between this hill and the next and from which the cotton has just been blocked. Then he swings the knuckles and hoes again apart to pass the next hill, and so on. If desired this can be accomplished by the use of but a single pedal, by setting one casting nearer the center of the cross bars 20 and the other nearer to one side of the arch, permitting the hoe carried by the first named casting to travel close alongside the standing hills, and giving the other hoe all the outward and inward movement. But I prefer the simultaneous movement of both hoes as first described, as probably giving the best results. These cultivating elements cut out the grass and weeds down to a certain depth, and the natural result of that action is that the moist earth beneath the surface is left exposed and considerable earth is taken away from around the stalks of the standing cotton plants. As is well known, cotton requires a warm climate and prolonged hot weather for successful growth; and in order that the ground shall not dry out I consider it essential that the supplemental harrowing elements at the rear of the machine shall complete the operation of harrowing at one passage of this cultivator along the row. Accordingly the proper elements 120 and 122 are connected with the beams 111, and the latter adjusted vertically and laterally, with the result that these elements travel in straight lines alongside the standing hills and plow or cultivate the earth rather deeply if plows be used, or scrape or gather the earth around the stalks of the standing plants as is necessary to encourage their growth. Of course these rear cultivating elements do not have the outward and inward movement of the hoes 50 and therefore do not, strictly speaking, cultivate the ground between the hills; but if plows are used they will cultivate the earth to such a depth that their furrows will run into each other and in any event their shares should be so shaped as to throw the earth against the hills and ridge it up between them. If now the driver sees that he is approaching an obstruction, such as a rock or stump, he may depress the handle of the lever 97 to lift the forward shaft section 86 and raise the entire blocking hoe off the ground; he could remove his feet to the pedals 66 and manipulate the latter so as to raise both lower shaft sections 53 and lift the hoes 50 entirely off the ground; and he could manipulate the two hand levers 130 so that their cranks 132 would raise the rear cultivating elements off the ground. Therefore it is possible to drive the machine over quite an obstruction without injury to its elements. In due time the field will need cultivation again, but on this occasion the blocking hoe is omitted because the cotton is now in hills. Otherwise the process above described is repeated with the same cultivating elements at front and rear or with others if the nature of the plants or the character of the soil demands. It is quite within the scope of this invention, that in addition to the front and rear cultivating elements a fertilizer distributer could be employed, carried by the framework between its front and rear and driven by suitable connection with the main axle or shaft, and after the forward cultivating elements or hoes have treated the ground and torn up the soil, the fertilizer is dropped onto and into it and the rear elements cover it up. I consider it hardly necessary to illustrate this detail. The above operation is repeated as often as necessary as the plants develop and grow, and when they reach such a height that their heads are struck by the lowermost cross bar 20, treatment by the front cultivator elements is no longer necessary and they, with their castings and connections, can be entirely removed, as well as both cross bars. Then the set screw 4 is loosened, all pedals removed as they are now useless, and the shaft 3 slid through the hub of the gear 80 into one of the tubular axle sections 2 (preferably the left in Fig. 9) where it can be held in place by resetting the set screw 9; and the gear 80 removed. Now as the machine progresses along the row the arches 16, 14 and 10 and the seat 11 move over the heads of plants which are quite tall and about whose stalks grass will no longer grow on account of the shade they cast, and therefore further cultivation by the hoes 50 is unnecessary. At this time, the rear cultivating elements may be such as are necessary to treat the plants which have matured to this extent.

What I claim is:

1. A cultivator of the class described, comprising a frame mounted upon a two-part axle, spaced castings carried by the frame, a swinging knuckle pivoted to each casting, an upright shaft journaled in the knuckle, driving connections leading from the shaft through the casting to one part of the axle, a rotary cultivating element at the lower end of the shaft, said shaft being telescopic within its length, a collar fixed to its lower section, an arcuate loop embracing said section below the collar, manually operated means for swinging the knuckle around said shaft and means for raising and lowering said loop irrespective of the position of the knuckle, for the purpose set forth.

2. A cultivator of the class described comprising a frame mounted upon a two-part axle, spaced castings carried by the frame, a swinging knuckle pivoted to each casting, an upright shaft journaled in the knuckle, driving connections leading from the shaft through the casting to one part of the axle, a rotary cultivating element at the lower end of the shaft, and means for permitting the lifting of each element from the ground; combined with two sets of pedals mounted on the frame, connections between each pedal of one set and one of said knuckles for swinging the latter outward and inward, and connections between each pedal of the other set and said lifting means.

3. A cultivator of the class described comprising a frame mounted on a two-part wheeled axle, two swinging knuckles carried by the frame, upright telescopic shafts journaled in said knuckles, a rotary cultivating element and a collar carried by the lower section of each shaft, and driving connections between the upper part of each section and one of the axles; combined with pedals pivoted within the frame, arcuate loops inclosing the lower shaft-sections beneath their collars, connections between the pedals and said loops, and means for swinging the knuckles outwardly and inwardly, for the purpose set forth.

4. A cultivator of the class described comprising a frame mounted on a two-part wheeled axle, two swinging knuckles carried by the frame, upright telescopic shafts journaled in said knuckles, a rotary cultivating element and a collar carried by the lower section of each shaft, and driving connections between the upper part of each section and one of the axles; combined with two pairs of pedals pivoted within the frame, rods connecting those of one pair with said knuckles for swinging the latter outwardly and inwardly, arcuate loops inclosing the lower shaft-sections beneath their collars, and connections between the remaining pedals and said loops, for the purpose set forth.

5. A cultivator of the class described comprising a frame mounted on a two-part wheeled axle, two swinging knuckles carried by the frame, upright telescopic shafts journaled in said knuckles, a rotary cultivating element and a collar carried by the lower section of each shaft, and driving connections between the upper part of each section and one of the axles; combined with two pairs of pedals pivoted within the frame, rods connecting those of one pair with said knuckles for swinging the latter outwardly and inwardly, arcuate loops inclosing the lower shaft-sections beneath their collars, levers pivotally supported at one end by the frame and attached at their other end to said loops, chains leading from the other pair of pedals to said levers respectively, and a spring normally depressing the lower section of each shaft.

6. A cultivator of the class described comprising a frame mounted on a wheeled axle and having a transverse arch, cross bars detachably connected with the side arms of said arch and themselves longitudinally slotted, a pair of castings adjustably mounted in said slots, upright shafts through the castings, knuckles pivotally mounted on said shafts, and shafts journaled in the swinging ends of said knuckles and carrying rotary cultivating elements; combined with driving connections from each cultivator shaft to its pivot shaft and from the latter to the axle of the machine, and manually operable devices for independently swinging said knuckles outward and inward, for the purpose set forth.

7. A cultivator of the class described comprising a frame mounted on a two-part wheeled axle and having a transverse arch, cross bars detachably connected with the side arms of said arch and themselves longitudinally slotted, a pair of casings adjustably mounted in said slots, upright shafts through the castings, knuckles pivotally mounted on said shafts, telescopic shafts journaled in said knuckles, and rotary cultivating elements carried by the lower sections of these shafts; combined with driving connections from each telescopic shaft to its pivot shaft and from the latter to the axle section at that side of the machine, and manually operable devices for independently swinging said knuckles outward and inward, for the purpose set forth.

In testimony whereof I affix my signature in presence of two witnesses.

CLARENCE E. PIERCE.

Witnesses:
 ROBT. T. LANG,
 N. L. COLLAMER.

Copies of this patent may be obtained for five cents each, by addressing the "Commissioner of Patents, Washington, D. C."